United States Patent [19]

Kallenberger

[11] Patent Number: 5,290,069
[45] Date of Patent: Mar. 1, 1994

[54] JOURNAL BEARING WITH BEARING-SHAFT CLEARANCE ZONE

[75] Inventor: Harvey J. Kallenberger, Wind Lake, Wis.

[73] Assignee: Harnischfeger Corporation, Brookfield, Wis.

[21] Appl. No.: 84,443

[22] Filed: Jul. 1, 1993

Related U.S. Application Data

[63] Continuation of Ser. No. 921,860, Jul. 29, 1992, abandoned.

[51] Int. Cl.$^5$ ............................................. F16C 17/02
[52] U.S. Cl. ................................................... 384/129
[58] Field of Search ............... 384/275, 294, 296, 429, 384/430

[56] References Cited

U.S. PATENT DOCUMENTS

| Re. 32,764 | 10/1988 | Smith et al. | 384/275 |
| 4,989,998 | 2/1991 | Willis et al. | 384/275 |
| 5,062,718 | 11/1991 | Lenhard-Backhaus et al. | 384/275 |
| 5,161,748 | 11/1992 | Iguchi et al. | 384/192 |

Primary Examiner—Lenard A. Footland
Attorney, Agent, or Firm—Jansson & Shupe

[57] ABSTRACT

The invention is an improvement in a mechanical drive train having a bushing-type plain journal bearing, a housing radially supporting the bearing to a reference plane, and a shaft extending through the bearing beyond the reference plane. That portion of the bearing between the reference plane and a bearing end is unsupported by the housing and therefore subject to fatigue breakage as the shaft repeatedly deflects or tips. The improvement comprises a contoured surface formed on an end of the bearing to define a clearance zone. When the shaft deflects or tips under load or for other reasons, the shaft is prevented from contacting the bearing along the zone. Fatigue breaking of the bearing is thereby substantially reduced. The invention also helps reduce localized heating and wear and formation of wear particles which may result in secondary damage. All of the foregoing would contribute to reduced bearing life.

6 Claims, 5 Drawing Sheets

JOURNAL BEARING WITH BEARING-SHAFT CLEARANCE ZONE

RELATED APPLICATION

This application is a continuation of application Ser. No. 07/921,860 filed Jul. 29, 1992, and now abandoned.

FIELD OF THE INVENTION

This invention relates generally to multi-part mechanical devices and, more particularly, to mechanical drive trains for power transmission.

BACKGROUND OF THE INVENTION

Mechanical drive trains use gears, shafts, gearboxes, pulleys and the like to transmit power from a "prime mover," e.g., an electric motor or internal combustion engine, to an end-use function. All such drive trains use a number of bearings and, often, such bearings are of differing types. For example, the output shaft of an electric motor, considered a high speed shaft, is supported on ball, roller or some other type of so-called hydrodynamic bearing. Such bearings are so named because of the way their surfaces are "self-lubricated" as they roll.

At other locations, such drive trains may use what are called bushing-type or plain journal bearings. Journal bearings do not use rolling balls or cylinders. Rather, they are simply cylindrical tubes, with or without flanged ends, and are often made of brass or bronze. Journal bearings, said to be "boundary lubricated," are used in drive train applications where relative rotational speed is quite low and where the bearing and shaft through the bearing are subjected to high-impact, tipping or bending loads or a combination of such loads.

Journal bearings (which are fitted over a shaft) are often fitted into a surrounding housing. To put it another way, the bearing is interposed between a shaft and a housing, the latter "reinforcing" and supporting the bearing against loads imposed on it by the shaft. However, the housing may not span the entirety of the distance between the bearing ends. As a consequence, a portion of the bearing near one or both ends is radially unsupported.

An unsupported portion is therefore exposed to shaft-imposed forces which may repeatedly deform and "fatigue" the end of the bearing. This can and does cause the bearing to eventually fracture around a portion or all of the bearing circumference. Machine downtime and a (usually) expensive repair follow.

Known journal bearings are made with a slight "corner break" or radius at the junction of an end face and the internal bore. Such a radius is provided to prevent fragmentation of tiny particles from what would otherwise be a rather sharp edge. As will become apparent, such a radius is unrelated to the invention.

An improved mechanical drive train having a journal bearing with a contoured surface to define a clearance zone between the shaft and the bearing would help prevent bearing fatigue breaking, excessive localized heating and wear and the formation of wear particles (all of which reduce bearing life), and, therefore, would be an important advance in the art.

This application refers to shafts which "deflect" or which are "deflected." As used herein, such terms refer to shafts which are bent, which are tipped or which, by a combination of bending and tipping forces, are made other than straight and/or other than axially aligned with a bearing.

OBJECTS OF THE INVENTION

It is an object of the invention to provide an improved mechanical drive train overcoming some of the problems and shortcomings of the prior art.

Another object of the invention is to provide a mechanical drive train having one or more improved journal bearings.

Yet another object of the invention is to provide a mechanical drive train in which a deflected shaft is prevented from fatigue-breaking a radially-unsupported portion of a journal bearing.

Still another object of the invention is to provide a mechanical drive train in which a drive train shaft, even though normally deflected, is prevented from contacting an end of a journal bearing surrounding the shaft.

Another object of the invention is to provide a mechanical drive train exhibiting reduced heating and minimizing the number of wear particles resulting from operation with a deflected shaft.

Yet another object of the invention is to provide a mechanical drive train having one or more improved journal bearings, ends of which are prevented from being broken off by otherwise-repetitive, fatiguing contact with a deflecting shaft. How these and other objects are accomplished will become more apparent from the following descriptions taken in conjunction with the drawing.

SUMMARY OF THE INVENTION

The invention resolves problems relating to fatigue breaking of a radially-unsupported end of a bushing-type plain journal bearing. Such breaking can result when the shaft extending through the bearing repeatedly deflects and bends radially outward against the end, thereby "fatigues" the bearing and, finally, breaks off a ring-like portion of the end.

The invention is an improvement in a mechanical drive train having a plain journal bearing with a bearing end and a housing radially supporting the bearing to a reference plane. In such a drive train, a shaft extends through the bearing beyond the reference plane and, normally, at least to the bearing end.

The improvement comprises a contoured surface formed on the bearing to define a clearance zone between the unsupported end and the shaft. The shaft is thereby prevented from contacting the bearing and fatigue breaking of the bearing is substantially reduced or even avoided entirely.

Parts of this summary use geometric terms which may be somewhat difficult to visualize without reference to a drawing. The detailed description (set out below) and the drawing will, if carefully analyzed, clarify such terms.

In a highly preferred embodiment, the contoured or "relief" surface extends between the end and the reference plane. The "contour" of the surface can take any of several shapes, each of which is described with reference to a "viewing plane" and to the shaft axis of rotation which is coincident with such viewing plane. In one version, that portion of the surface coincident with the viewing plane defines a curved line. In another version, that portion of the surface coincident with the viewing plane defines a compound curved line and in yet another version, that portion of the surface coincident with the viewing plane defines a straight line.

And there are other contour shape possibilities. For example, that portion of the surface coincident with the viewing plane may define a line which is a "composite," i.e., which has plural segments selected from a group of segments including a curved segment, a compound curved segment and a straight segment.

When the shaft is undeflected, the clearance zone comprises a generally V-shaped annular space between the surface and the shaft. However, as the shaft deflects, a portion of the space may "close up" or even substantially disappear in that area where the shaft approaches or comes into rather light contact with the radially-unsupported end.

DETAILED DESCRIPTION OF PREFERRED EMBODIMENTS

Figure 9:
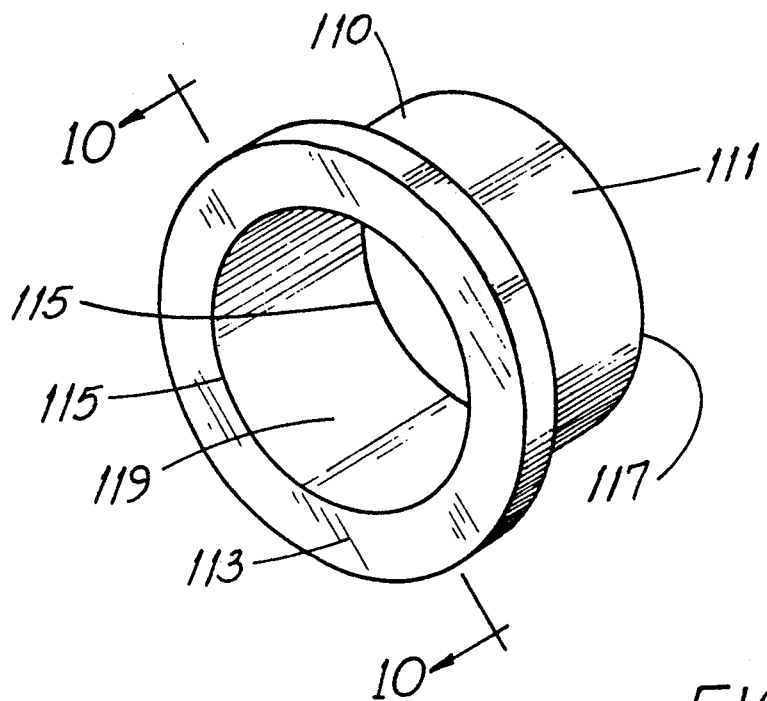
FIG. 9 is an isometric view of a prior art, unimproved plain journal bearing.
Figure 10:
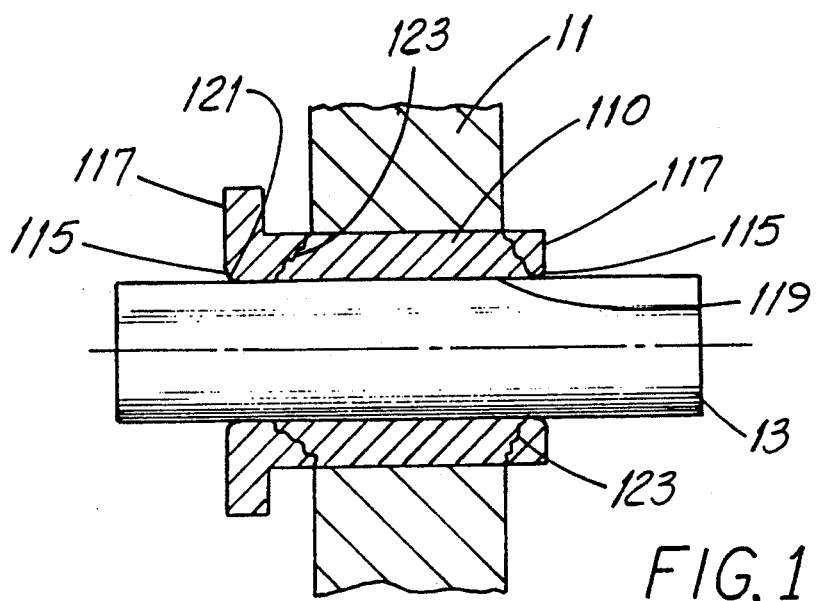
FIG. 10 is a view, partly in cross-section, taken along the viewing plane 10—10 of FIG. 9, and also includes a shaft through the bearing and a housing supporting the bearing along a portion of its length. The viewing plane is coincident with the central long axis of the bearing of FIG. 9.

Referring first to FIGS. 9 and 10, the inventive bearing 10 will be better appreciated by first having an understanding of aspects of a conventional bushing-type journal bearing 110 and how such a bearing 110 is typically mounted. Such a bearing 110 has a tubular body 111, the wall of which is of generally uniform thickness. The bearing 110 may consist only of such a body 111 or may also include a radially outwardly extending flange 113 at one or both ends. An edge 115 is formed at the junction of an end face 117 and the internal bore 119 and, typically, such edge 115 is formed to a slight radius as shown in the region 121. Such otherwise knife-like edges 115 are referred to in the industry as thereby being "broken" and a common notation on manufacturing drawings is to "break the edge" or "break corner" to a particular small radius or chamfer.

It is apparent from FIG. 10 that the radius in the region 121 does not extend to that portion of the bearing 110 which is supported by, say, a bearing housing 11. For that reason, a deflected shaft 13 may create areas of unusually high stress, often called "stress risers" because of the shape of a graphic curve representing stress. As a result, the bearing 110 "fatigues" and fractures 123 often result. The inventive bearing 10 solves this problem in a unique and imaginative way.

Figure 1:
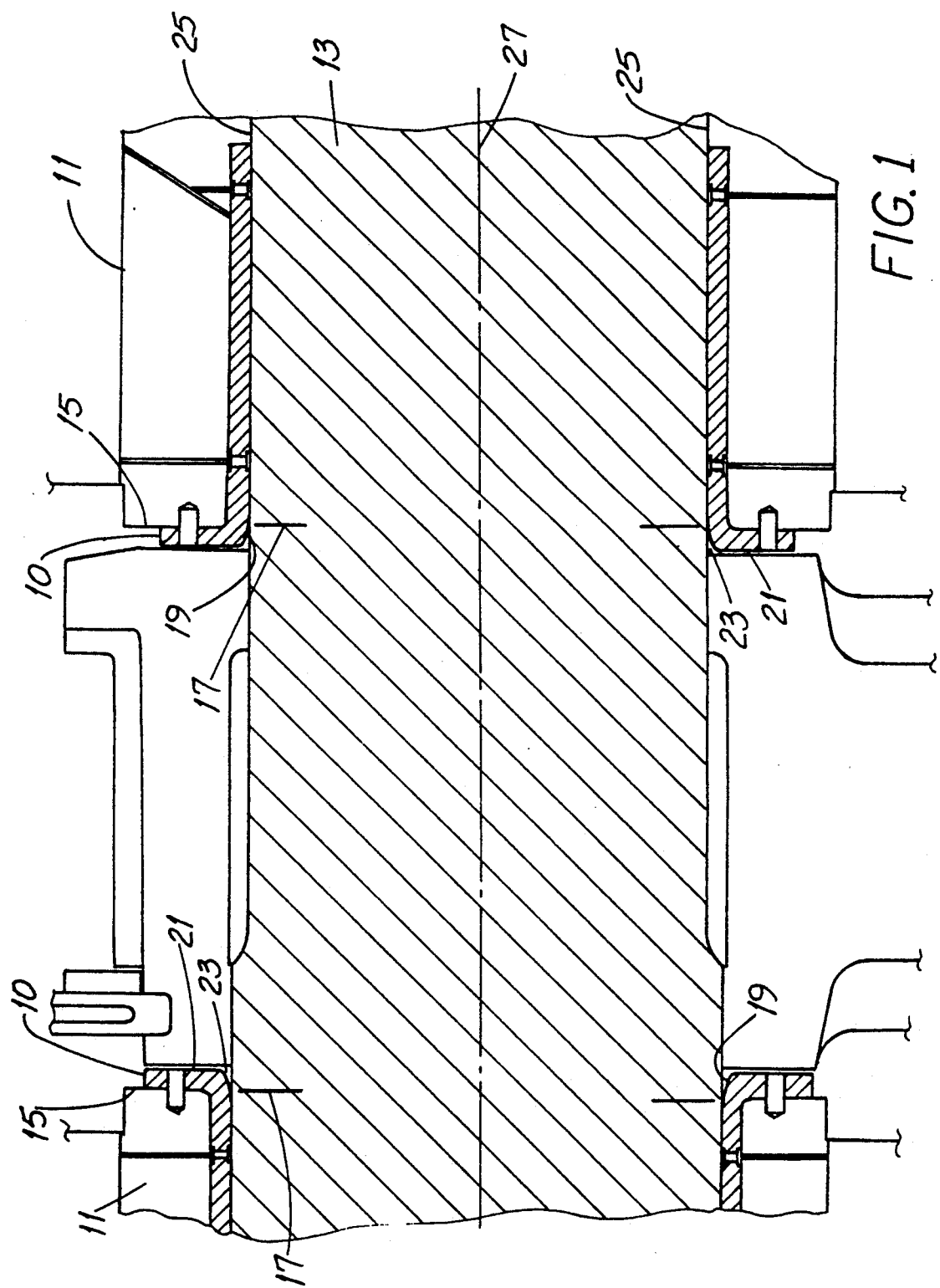
FIG. 1 is a cross-sectional view, with parts broken away, of the inventive journal bearing shown in conjunction with mechanical drive train components.
Figure 2:
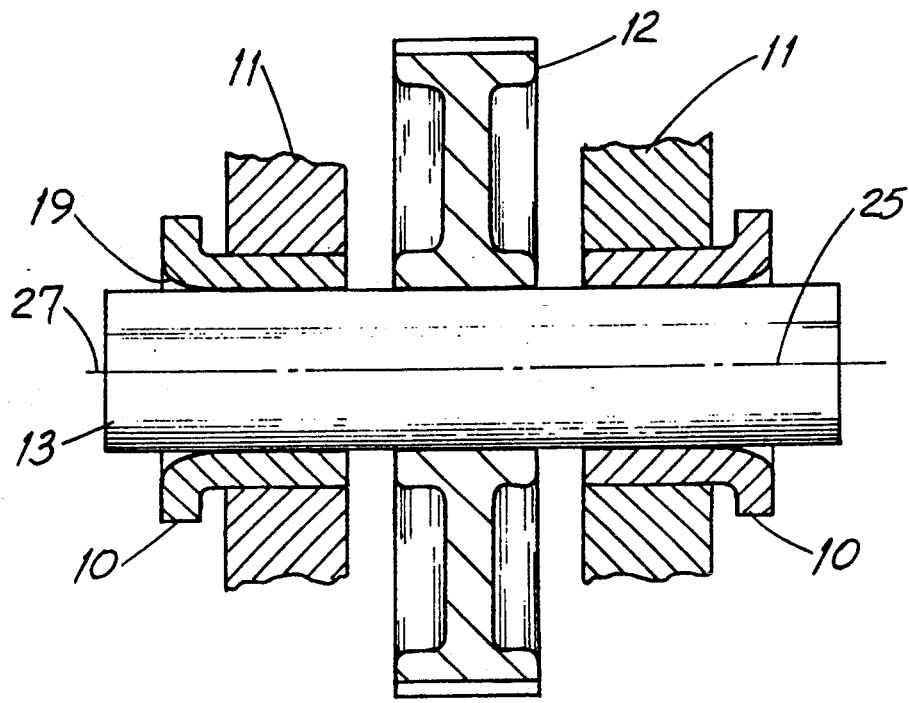
FIG. 2 is a view, partly in cross-section and with parts broken away, of the inventive journal bearing shown in conjunction with an exemplary housing and shaft supporting a gear.
Figure 3:
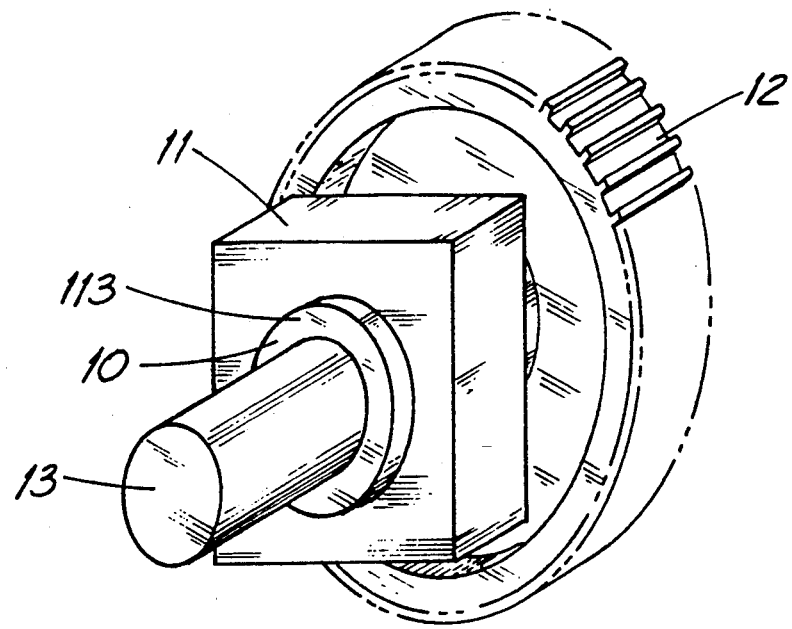
FIG. 3 is an isometric view of a portion of the exemplary structure of FIG. 2.

Referring to FIGS. 1-3 from which certain cross-hatching has been omitted for clarity, the improved plain journal bearing 10 is shown in conjunction with components of a mechanical drive train. Such components include a housing 11 wall radially supporting a bearing 10 along a portion of the bearing length. In FIGS. 1 and 2, two bearings 10 and two housings 11 are shown in support of a gear 12, such gear 12 being exemplary of any component supported on, driven by or driving a shaft. The invention will be described primarily with respect to only one bearing 10 and housing 11.

The side face 15 of the housing 11 is coincident with and defines a reference plane 17 which extends into and out of the drawing sheet and is perpendicular to such sheet. In FIG. 1, the viewer sees the edge of the reference plane 17. A shaft 13 extends through the bearing 10 beyond the reference plane 17 at least to the bearing end and, typically, beyond such end.

A contoured surface 19 (somewhat resembling a chamfer) is formed circumferentially around the end 21 of the bearing 10 and preferably extends between the end 21 and the reference plane 17. As described in greater detail below, the surface 19 and the shaft 13 define a generally V-shaped annular space 23 when the shaft 13 is undeflected. This space 23 is referred to as a clearance zone.

It is helpful to describe aspects of the contoured surface 19 with respect to a viewing plane 25. Considering FIG. 2, the shaft 13 has an axis of rotation 27 coincident with a viewing plane 25. Such viewing plane 25 extends perpendicularly into and out of the drawing sheet in FIG. 2 and the viewer sees the edge of such plane 25. In FIG. 1, the viewing plane 25 and the axis 27 are coincident and the plane 25 is coincident with the drawing sheet.

It should be appreciated that the more common arrangement is to mount the bearing 10 with its flange toward the supported component as shown in FIG. 1. In the arrangement of FIG. 2, the flanges are away from the gear 12 to show an alternate arrangement.

Figure 4:
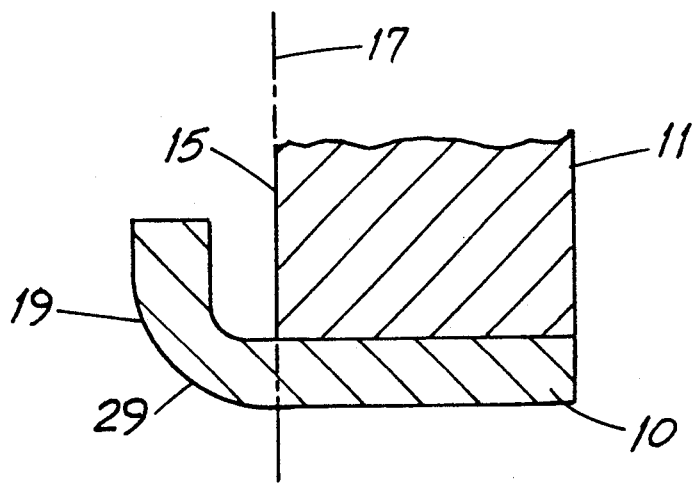
FIGS. 4, 5 and 6 are cross-sectional views, with parts broken away, showing exemplary contoured surfaces on a bearing.

In the views of FIGS. 1, 2 and 4, that portion of the contoured surface 19 which is coincident with the viewing plane 25 defines a curved line 29. In a way familiar to persons in the mechanical and geometric arts, the surface is "generated" by rotating the line 29 about the axis 27.

Figure 5:
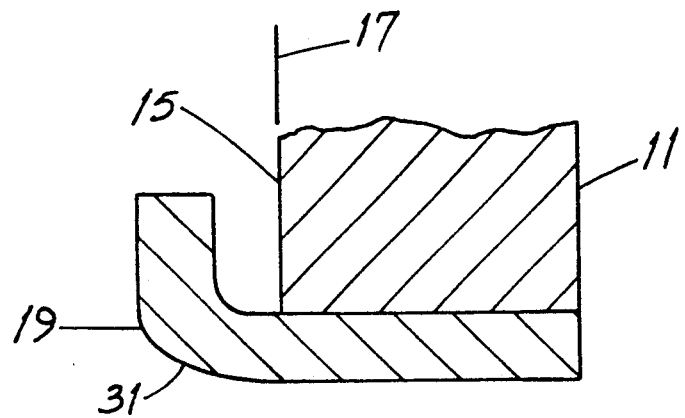
Figure 6:
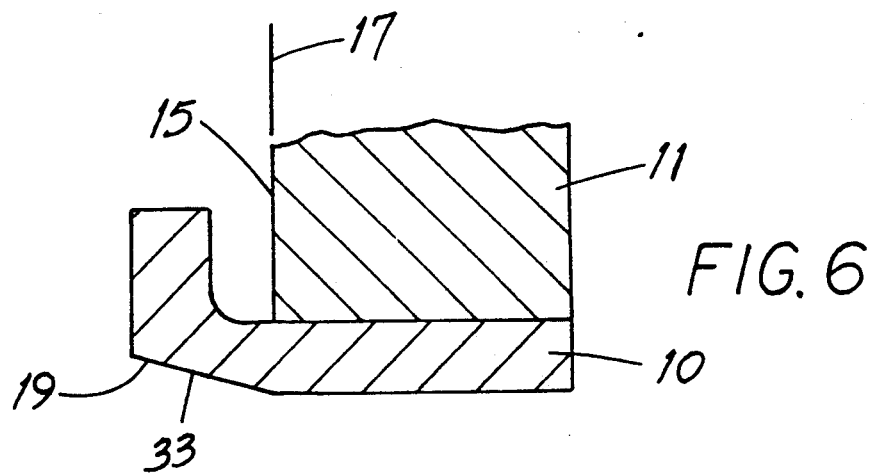

However, such surface 19 can have any of a variety of shapes and still be effective for its purpose. For example, that portion of the surface 19 coincident with the viewing plane 17 as shown in FIG. 5 defines a compound curved line 31, i.e., a line 31 having segments formed using two different radii. And it is to be appreciated that the compound curved line 31 could be formed using a constantly changing radius, i.e., such as formed as a segment of a parabola. That portion of the surface 19 coincident with the viewing plane 17 as shown in FIG. 6 defines a straight line 33. Other contoured surfaces 19 can be "generated" by selecting from a group of segments including a curved segment (FIG. 2), a compound curved segment (FIG. 5) and a straight segment (FIG. 6).

Figure 7:
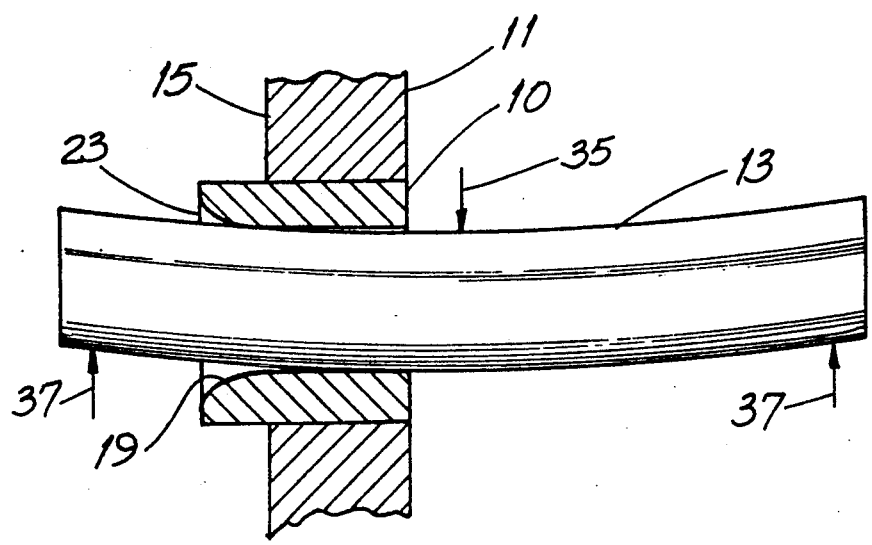
FIG. 7 is a view, partly in cross-section and with parts broken away, showing how the new journal bearing avoids bearing breakage in a drive train having a bent shaft.
Figure 8:
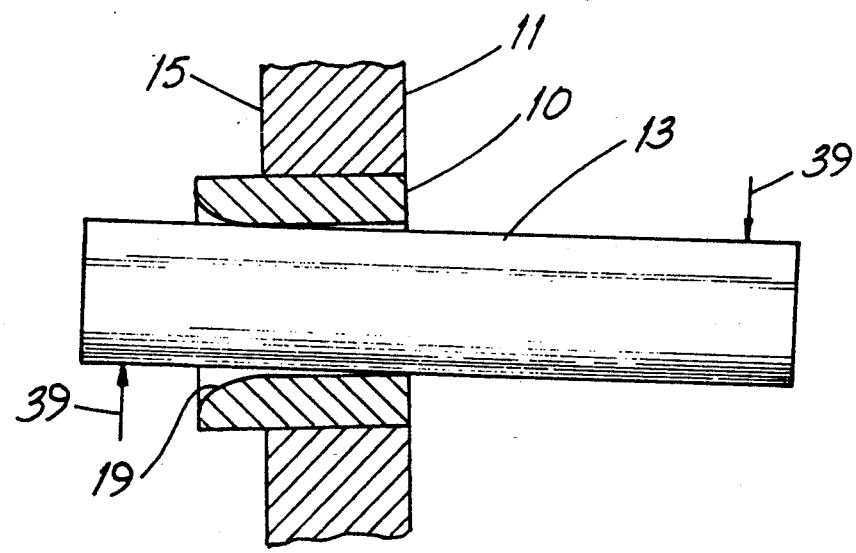
FIG. 8 is a view, partly in cross-section and with parts broken away, showing how the new journal bearing avoids bearing breakage in a drive train having a tipped or canted shaft.

FIGS. 7 and 8 show tube-like journal bearings 10 devoid of flanges 113. As shown in FIG. 7 and because of the assumed nature of the application in which the drive train is used, the shaft 13 may be subjected to bending loads as represented by the downward force vector 35 near the middle of the shaft 13 and the upward force vectors 37 at the shaft ends. In FIG. 8, the shaft 13 is shown to be subjected to what is called a "force couple," i.e., a pair of non-coincident but generally parallel forces 39 acting in opposite directions. Such forces 39 (or even a single force 39) tip but do not necessarily bend the shaft 13. And, of course, the shaft 13 may be subjected to a combination of such forces.

Using the improved bearing 10, it is now apparent that even though the shaft 13 may be bent, tipped or otherwise deflected, the shaft 13 is substantially prevented from contacting the bearing 10 because of the contoured surface 19 and the resulting space 23. Fatigue fractures 123 or breaking (such as are illustrated in FIG. 10) are substantially avoided.

This is not to say that in a severe instance of shaft deflection, the shaft 13 will never contact the surface 19. However, such incidents of shaft-surface contact are avoided in all but the most extreme cases.

While the principles of the invention have been shown and described in connection with specific embodiments, it should be clearly understood that such descriptions and embodiments are exemplary and not intended to limit the invention.

I claim:

1. In a mechanical drive train for transmitting power from a prime mover to an end-use function and having (a) first and second bushing-type plain journal metal bearings, each having a bearing outer end, (b) a housing radially supporting the bearings and having a housing end substantially coincident with a reference plane, and (c) a cylindrical shaft supported by the bearings and extending through at least the first bearing beyond the reference plane at least to the end of the first bearing, the improvement comprising:

a contoured surface formed on the interior surface of the first bearing and being substantially bounded by the outer end of the first bearing and the reference plane, the contoured surface being spaced from the shaft to define a clearance zone, wherein the shaft is substantially prevented from contacting the bearing along the contoured surface and fatigue breaking of the bearing is substantially reduced.

2. The improvement of claim 1 wherein the clearance zone comprises a generally V-shaped annular space between the surface and the shaft when the shaft is undeflected.

3. The improvement of claim 1 wherein the shaft has an axis of rotation coincident with a viewing plane and that portion of the surface coincident with the viewing plane defines a curved line.

4. The improvement of claim 1 wherein the shaft has an axis of rotation coincident with a viewing plane and that portion of the surface coincident with the viewing plane defines a compound curved line.

5. The improvement of claim 1 wherein the shaft has an axis of rotation coincident with a viewing plane and that portion of the surface coincident with the viewing plane defines a straight line.

6. The improvement of claim 1 wherein the shaft has an axis of rotation coincident with a viewing plane and that portion of the surface coincident with the viewing plane defines a line having plural segments selected from a group of segments including a curved segment, a compound curved segment and a straight segment.

* * * * *